(12) United States Patent
Chen et al.

(10) Patent No.: US 9,035,881 B2
(45) Date of Patent: May 19, 2015

(54) ELECTRONIC APPARATUS AND ELECTRONIC SYSTEM THAT CAN SELECT SIGNAL SMOOTHING APPARATUS, AND COMPUTER READABLE MEDIA THAT CAN PERFORM SIGNAL SMOOTHING METHOD THAT CAN SELECT SIGNAL SMOOTHING OPERATION

(71) Applicant: PixArt Imaging Inc., Hsin-Chu (TW)

(72) Inventors: Chun-Wei Chen, Hsin-Chu (TW); Yen-Chang Wang, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 75 days.

(21) Appl. No.: 14/055,882

(22) Filed: Oct. 17, 2013

(65) Prior Publication Data

US 2014/0368433 A1    Dec. 18, 2014

(30) Foreign Application Priority Data

Jun. 17, 2013  (TW) ............................. 102121351 A

(51) Int. Cl.
*G06F 3/033* (2013.01)
*G06F 3/03* (2006.01)

(52) U.S. Cl.
CPC .................................. *G06F 3/0317* (2013.01)

(58) Field of Classification Search
USPC ......... 345/166, 163, 173, 174, 179, 600, 473; 375/295; 348/296; 327/70
See application file for complete search history.

(56) References Cited

U.S. PATENT DOCUMENTS

| 6,252,584 | B1 * | 6/2001 | Wu ................................ | 345/166 |
|---|---|---|---|---|
| 8,259,092 | B2 * | 9/2012 | Lee et al. ........................ | 345/179 |
| 8,421,818 | B2 * | 4/2013 | Abe et al. ....................... | 345/600 |
| 2006/0115016 | A1 * | 6/2006 | Chen et al. ..................... | 375/295 |
| 2006/0170658 | A1 * | 8/2006 | Nakamura et al. ............. | 345/173 |
| 2007/0247426 | A1 * | 10/2007 | Vorst ............................. | 345/163 |
| 2008/0042986 | A1 * | 2/2008 | Westerman et al. ........... | 345/173 |
| 2009/0225207 | A1 * | 9/2009 | Jung et al. ..................... | 348/296 |
| 2009/0273550 | A1 * | 11/2009 | Vieri et al. ...................... | 345/87 |
| 2010/0271321 | A1 * | 10/2010 | Senda et al. ................... | 345/173 |
| 2012/0019480 | A1 * | 1/2012 | Cannon .......................... | 345/174 |
| 2013/0194240 | A1 * | 8/2013 | Kwong et al. ................. | 345/175 |
| 2013/0207691 | A1 * | 8/2013 | Buescher ........................ | 327/70 |
| 2014/0152673 | A1 * | 6/2014 | Lynn et al. ..................... | 345/473 |

* cited by examiner

*Primary Examiner* — Thuy Pardo

(74) *Attorney, Agent, or Firm* — Winston Hsu; Scott Margo

(57) ABSTRACT

An electronic apparatus that can utilize a first report rate to generate a first report rate output signal according to an output signal or can utilize a second report rate smaller than the first report rate to generate a second report rate output signal according to the output signal. The electronic apparatus comprises: a first signal smoothing apparatus; a second signal smoothing apparatus having a smooth ability smaller than the first signal smoothing apparatus and a processing unit, for selecting the first signal smoothing apparatus to process the first report rate output signal when the electronic apparatus utilizes the first report rate to generate signal, and for selecting the second signal smoothing apparatus to process the second report rate output signal when the electronic apparatus utilizes the second report rate to generate signal.

30 Claims, 6 Drawing Sheets

ELECTRONIC APPARATUS AND ELECTRONIC SYSTEM THAT CAN SELECT SIGNAL SMOOTHING APPARATUS, AND COMPUTER READABLE MEDIA THAT CAN PERFORM SIGNAL SMOOTHING METHOD THAT CAN SELECT SIGNAL SMOOTHING OPERATION

BACKGROUND OF THE INVENTION

1. Field of the Invention

The present invention relates to an electronic apparatus and an electronic system that can select a signal smoothing apparatus, and a computer readable media that can perform a signal smoothing method that can select a signal smoothing operation, and particularly relates to an electronic apparatus and an electronic system that can automatically select a signal smoothing apparatus according to a report rate, and a computer readable media that can perform a signal smoothing method that can automatically select a signal smoothing operation according to the report rate.

2. Description of the Prior Art

In the prior art, a signal smoothing operation is always performed to a signal to smooth it. As shown in FIG. 1, data points in the signal S initially have larger differences there between. A smoothed signal S' with data points having smaller differences there between is generated after the signal smoothing operation is performed to the signal S. Different signal smoothing operations have different smoothing abilities. A smoothing level for the signal is better if a smoothing operation with a more powerful smoothing ability is performed to the signal, but the processing time is longer such that real time movement for the electronic apparatus is affected and the computing steps for the signal smoothing operation are more complicated. On the contrary, a smoothing level for the signal is worse if a smoothing operation with a less powerful smoothing ability is performed to the signal, but the processing time is shorter such that real time movement for the electronic apparatus is better and the computing steps for the signal smoothing operation can be simplified. Therefore, it is hard to select a suitable signal smoothing operation.

SUMMARY OF THE INVENTION

Therefore, one objective of the present invention is to provide an electronic apparatus, an electronic system and a related method that can automatically select a signal smoothing apparatus according to the report rate.

One embodiment of the present invention discloses an electronic apparatus that can automatically select a signal smoothing apparatus according to a report rate, the electronic apparatus utilizes a first report rate to generate a first report rate output signal according to an output signal, or utilizes a second report rate smaller than the first report rate to generate a second report rate output signal according to the output signal. The electronic apparatus comprises: a first signal smoothing apparatus; a second signal smoothing apparatus, wherein a smoothing ability of the first signal smoothing apparatus is higher than which of the second signal smoothing apparatus; and a processing unit, for controlling the first signal smoothing apparatus to process the first report rate output signal to generate a first smoothed signal if the electronic apparatus generates the first report rate output signal, and for controlling the second signal smoothing apparatus to process the second report rate output signal to generate a second smoothed signal if the electronic apparatus generates the second report rate output signal. Variation of the first smoothed signal is smaller than which of the second smoothed signal.

Another embodiment of the present invention discloses an electronic system that can automatically select a signal smoothing apparatus according to a report rate, which comprises: a first electronic apparatus; a second electronic apparatus; a transmitting interface, wherein the second electronic apparatus transmits at least one output signal to the first electronic apparatus via the transmitting interface, where the second electronic apparatus or the transmitting interface utilizes a first report rate to output a first report rate output signal according to an output signal, or utilizes a second report rate smaller than the first report rate to output a second report rate output signal according to the output signal; a first signal smoothing apparatus; a second signal smoothing apparatus, wherein a smoothing ability of the first signal smoothing apparatus is higher than which of the second signal smoothing apparatus; and a processing unit, for controlling the first signal smoothing apparatus to process the first report rate output signal to generate a first smoothed signal if the second electronic apparatus or transmitting interface outputs the first report rate output signal, and for controlling the second signal smoothing apparatus to process the second report rate output signal to generate a second smoothed signal if the second electronic apparatus or the transmitting interface outputs the second report rate output signal. Variation of the first smoothed signal is smaller than which of the second smoothed signal.

Signal smoothing methods can be acquired according to above-mentioned embodiments, which can be performed via a computer readable media having at least one program recorded thereon. The operations for the methods can be acquired in view of above-mentioned embodiments, thus are omitted for brevity here.

In view of the above mentioned embodiments, a suitable signal smoothing apparatus can be selected according to the report rate, thus the hard decision issue illustrated in the prior art can be solved.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
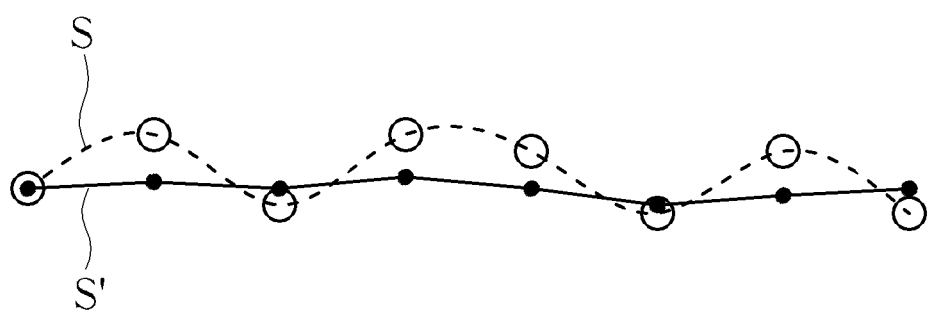
FIG. 1 is a schematic diagram illustrating a prior art signal smoothing operation.
Figure 2:
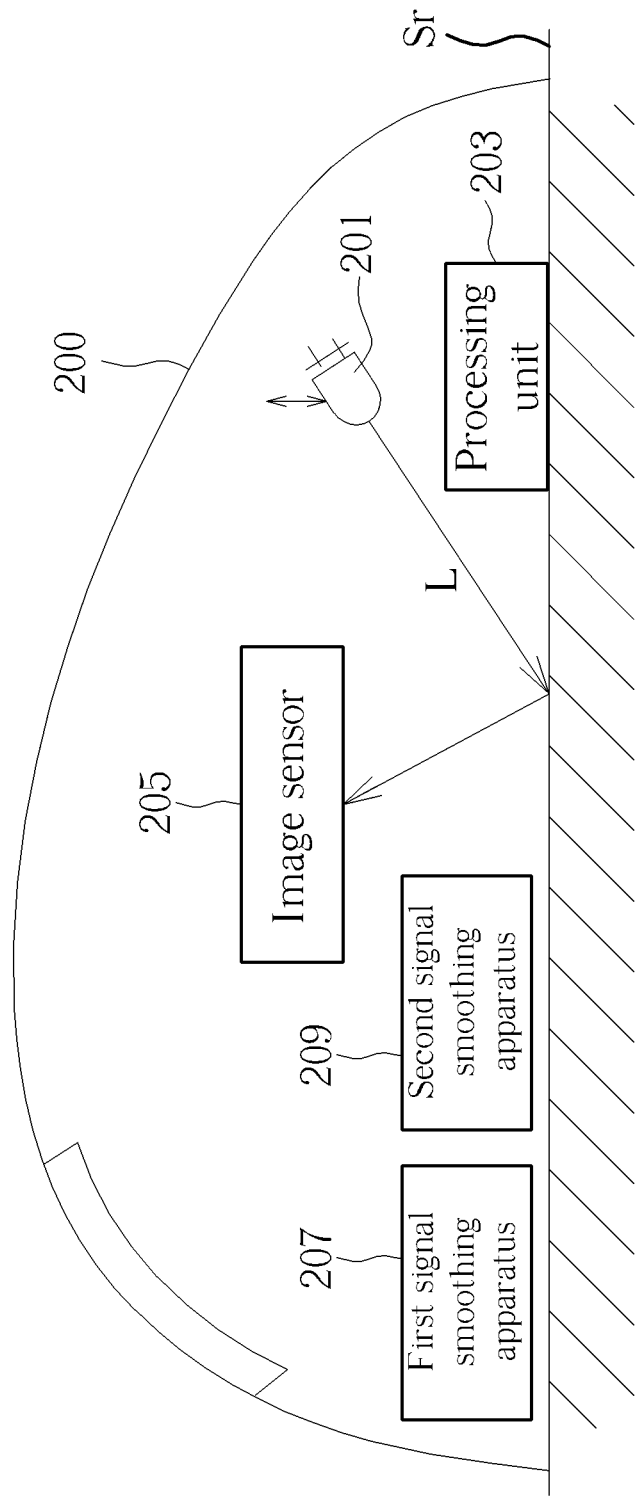
FIG. 2 is a schematic diagram illustrating an optical mouse according to an embodiment of the present invention.

The concept of the present invention will be described for detail via embodiments illustrated below. FIG. 2 is a schematic diagram illustrating an optical mouse 200 according to an embodiment of the present invention. An optical mouse is one kind of an optical navigating apparatus. As shown in FIG. 2, the optical mouse 200 comprises a light source 201, a processing unit 203, an image sensor 205, a first signal smoothing apparatus 207 and a second signal smoothing apparatus 209. The light source 201 emits light L to illuminate a surface Sr (ex. the desktop which the mouse is put on) to form an image signal. The image sensor 205 catches frames in the image signal. The processing unit 203 computes displacement for the optical mouse 200 according to the frames caught by the image sensor 205 to generate a displacement signal. The processing unit 203 determines which one of the first signal smoothing apparatus 207 and the second signal smoothing apparatus 209 is utilized to process the displacement signal according to the report rate of the optical mouse, and then outputs the processed displacement signal. The first signal smoothing apparatus 207 generates a first processed displacement signal if it processes the image signal, and the second signal smoothing apparatus 209 generates a second processed displacement signal if it processes the image signal. The variation for the first processed displacement signal is smaller than which of the second processed displacement signal. Report rate indicates a frequency that an electronic apparatus transmits data, for example, 1000 times/sec or 500 times/sec.

Figure 3:
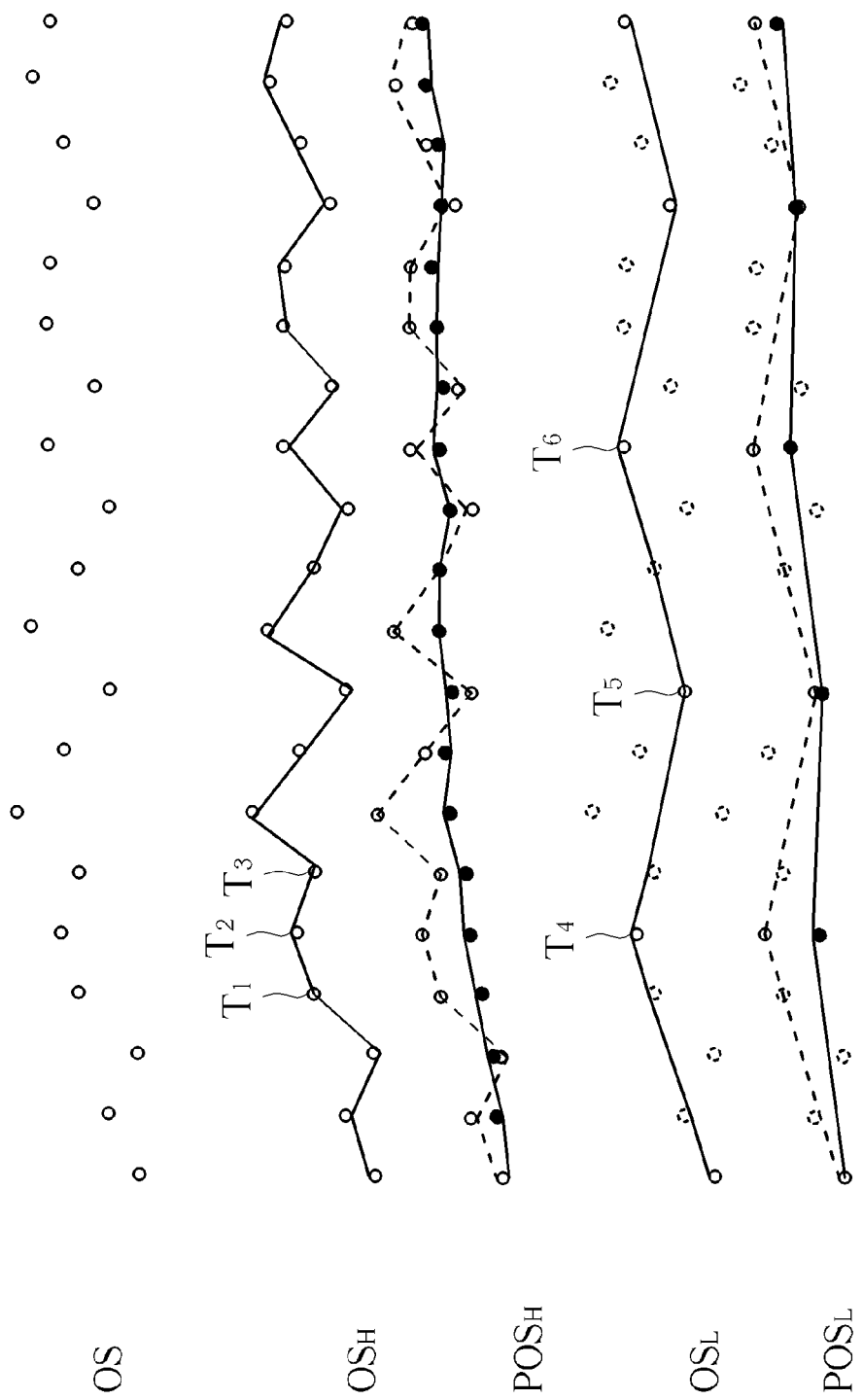
FIG. 3 is a schematic diagram illustrating how the first signal smoothing apparatus and the second signal smoothing apparatus in FIG. 2 process signals.

FIG. 3 is a schematic diagram illustrating how the first signal smoothing apparatus and the second signal smoothing apparatus in FIG. 2 process signals. In FIG. 3, the output signal OS is the displacement signal that the processing units generates according to the image signal received by the image sensor 205, the first report rate output signal $OS_H$ is the signal that the electronic apparatus 200 generates utilizing a high report rate, and the second report rate output signal $OS_L$ is the signal that the electronic apparatus 200 generates utilizing a low report rate. According to FIG. 3, the second report rate output signal $OS_L$ has an output frequency lower than which of the first report rate output signal $OS_H$ (i.e. fewer data points). In one embodiment, the processing unit 203 selects the first signal smoothing apparatus 207 with more powerful smoothing ability to process the first report rate output signal $OS_H$, and selects the second signal smoothing apparatus 209 with less powerful smoothing ability to process the second report rate output signal $OS_L$. The final outputted signal is either the first smoothed signal $POS_H$ or the second smoothed signal $POS_L$.

The strength for a smoothing operation can be determined by various factors, one of which is the timing for the output signal that the smoothing operation refers. In one embodiment, the optical mouse sequentially outputs the first report rate output signal $OS_H$ at a first data report point $T_1$, a second data report point $T_2$ and a third data report point $T_3$. Timing of the first data report point $T_1$ is earlier than which the second data report point $T_2$ and the third data report point $T_3$, and timing of the second data report point $T_2$ is earlier than which of the third data report point $T_3$. The first signal smoothing apparatus 207 smoothes the first report rate output signal $OS_H$ outputted at the second data report point $T_2$ according to the first report rate output signal $OS_H$ outputted at the first data report point $T_1$ if the processing unit 203 utilizes the first signal smoothing apparatus 207 to process the first report rate output signal $OS_H$. That is, the first signal smoothing apparatus 207 smoothes the first report rate output signal $OS_H$ outputted afterwards according the previously outputted first report rate output signal $OS_H$.

The optical mouse sequentially outputs the second report rate output signal $OS_L$ at a fourth data report point $T_4$, a fifth data report point $T_5$ and a sixth data report point $T_6$. Timing of the fourth data report point $T_4$ is earlier than which the fifth data report point $T_5$ and the sixth data report point $T_6$, and timing of the fifth data report point $T_5$ is earlier than which the sixth data report point $T_6$. The second signal smoothing apparatus 209 smoothes the second report rate output signal $OS_L$ outputted at the fifth data report point $T_5$ according to the second report rate output signal $OS_L$ outputted at the sixth data report point $T_6$ if the processing unit 203 utilizes the second signal smoothing apparatus 209 to process the second report rate output signal $OS_L$. That is, the second signal smoothing apparatus 209 smoothes the previously outputted second report rate output signal $OS_L$ according the second report rate output signal $OS_L$ outputted afterwards.

As above-mentioned, the first signal smoothing apparatus 207 smoothes the first report rate output signal $OS_H$ outputted afterwards according the previously outputted first report rate output signal $OS_H$ and the second signal smoothing apparatus 209 smoothes the previously outputted second report rate output signal $OS_L$ according the second report rate output signal $OS_L$ outputted afterwards, in such case the first signal smoothing apparatus 207 has smoothing ability more powerful than which of the second signal smoothing apparatus 209. A value of the afterward signal is closer to which of a previous signal if a signal is smoothed according to a previous signal, thus variation for a whole signal is smaller. Oppositely, a value of the afterward signal may already has large variation, thus variation for a whole signal is larger if a signal is smoothed according to an afterwards signal. Accordingly, if data points for the output signal OS already has larger differences there between, the first report rate output signal $OS_H$ outputted by the optical mouse 200 via a high report rate also has larger differences, thus a more powerful smoothing operation is needed. Oppositely, the second report rate output signal $OS_L$ outputted by the optical mouse 200 via a low report rate has data points arranged in a lower density, thus the variation thereof is lower than which of the image signal OS and only a less powerful smoothing operation is needed. Also, in one embodiment, if the report rate is lower than a predetermined value, the smoothing operation is not performed to the signal outputted from the optical mouse.

In one embodiment, the first signal smoothing apparatus 207 is a first filter and the second signal smoothing apparatus 209 is a second filter. A number for the stages of the first filter is more than which of the second filter. In another embodiment, the first filter is an IIR (infinite impulse response) filter, and the second filter is a FIR (finite impulse response) filter. The FIR filter is easy to be controlled since it has fixed stages but it provides less powerful smoothing operation due to limited frequency response function thereof. The IIR filter can be regarded having infinite stages since it has a feedback mechanism, thus it has an infinite frequency response function. Therefore, if an IIR filter is utilized for signal smoothing, it provides more powerful smoothing ability, but computing amount thereof is larger such that the IIR filter is hard to be controlled.

Figure 4:
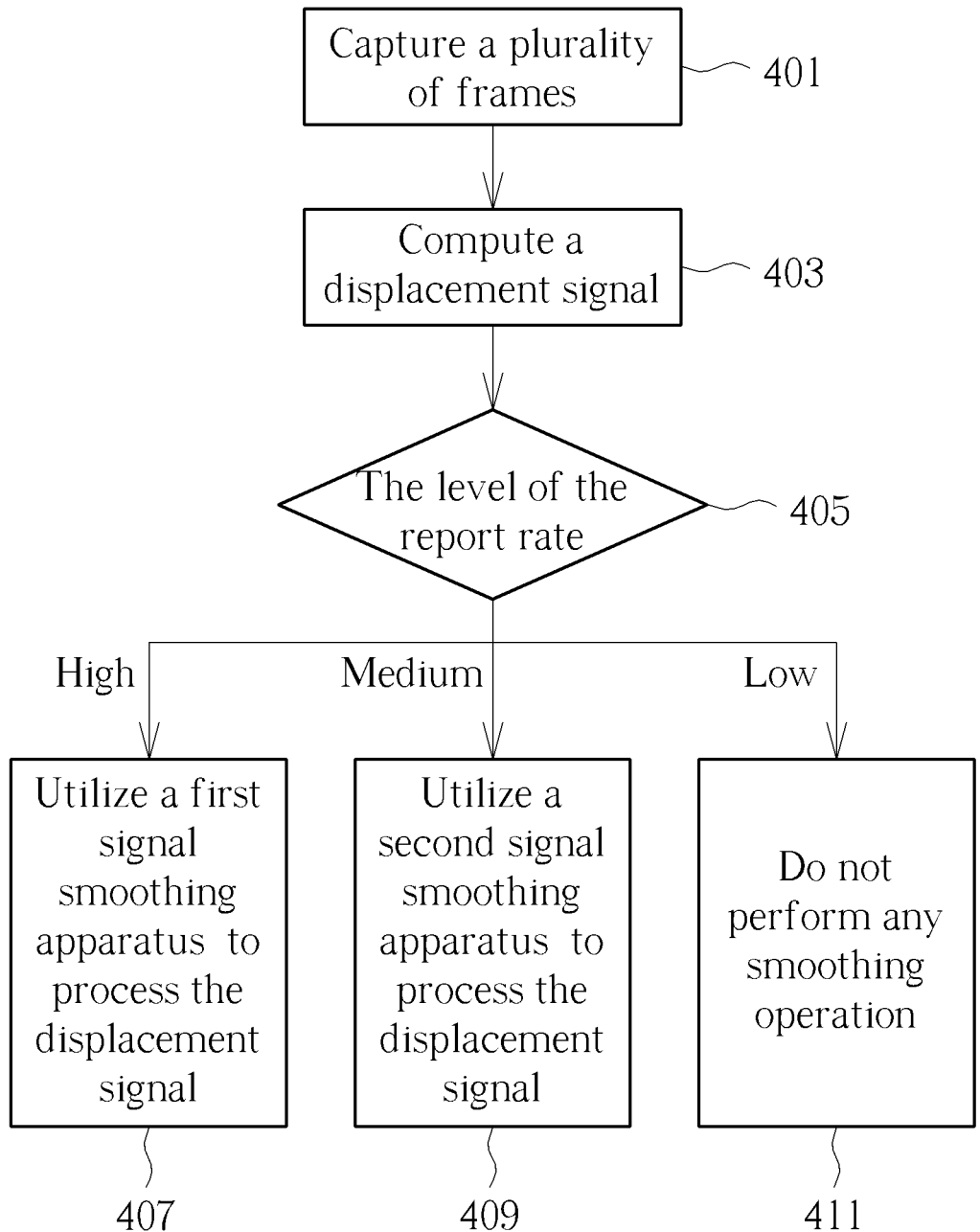
FIG. 4 is a flow chart illustrating a mechanism for automatically selecting a signal smoothing apparatus in FIG. 2.

FIG. 4 is a flow chart illustrating a mechanism for automatically selecting a signal smoothing apparatus in FIG. 2, which comprises the following steps:

Step 401

Capture a plurality of frames (ex. a plurality of frames in the image signal).

Step 403

Compute the displacement for the optical navigating apparatus to generate a displacement signal (i.e. the output signal OS in FIG. 2).

Step 405

Determine the level of the report rate, if it is high go to the step 407, if it is medium go to the step 409, if it is low go to the step 411.

In one embodiment, a first predetermined value and a second predetermined value smaller than the first predetermined value are set. The level is determined to be high if the report rate is higher than the first predetermined value, and the level is determined to be medium if the report rate is lower than the first predetermined value (if equal, both high and medium are ok). Further more, the level is determined to be medium if the report rate is between the first predetermined value and the second predetermined value, and the level is determined to be low if the report rate is lower than the second predetermined value. The level determining mechanism is not limited to abovementioned examples.

Step 407

Utilize a first signal smoothing apparatus (with more powerful smoothing ability) to process the displacement signal.

Step 409

Utilize a second signal smoothing apparatus (with less powerful smoothing ability) to process the displacement signal.

Step 411

Do not perform any smoothing operation.

Figure 5A:
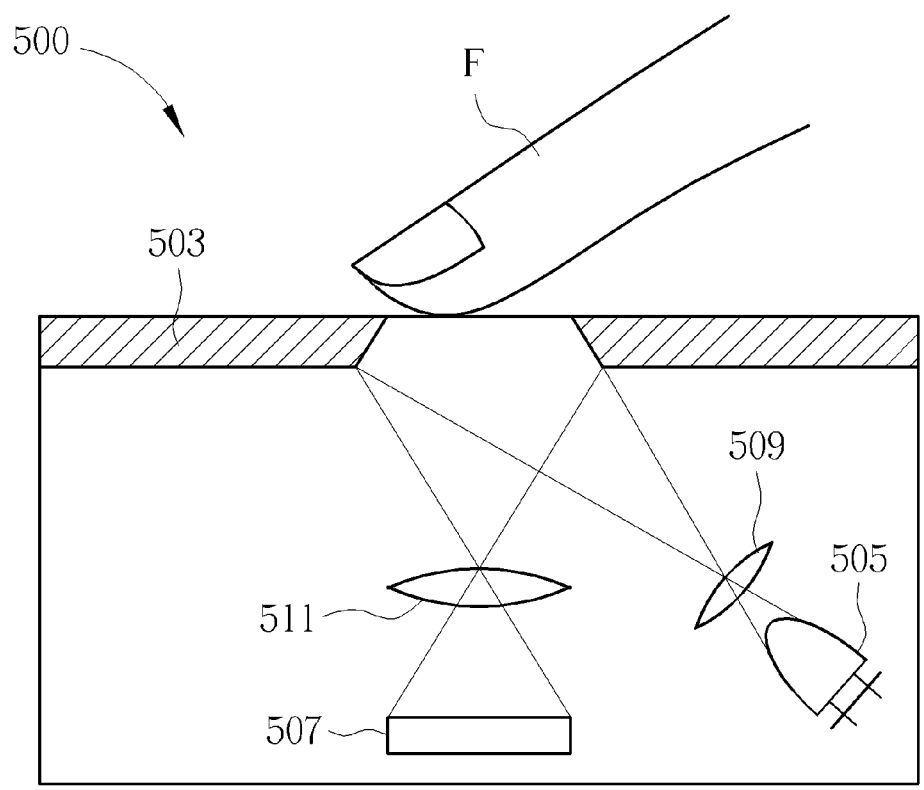
FIG. 5A and FIG. 5B are schematic diagrams illustrating an optical touch control apparatus according to an embodiment of the present invention.
Figure 5B:
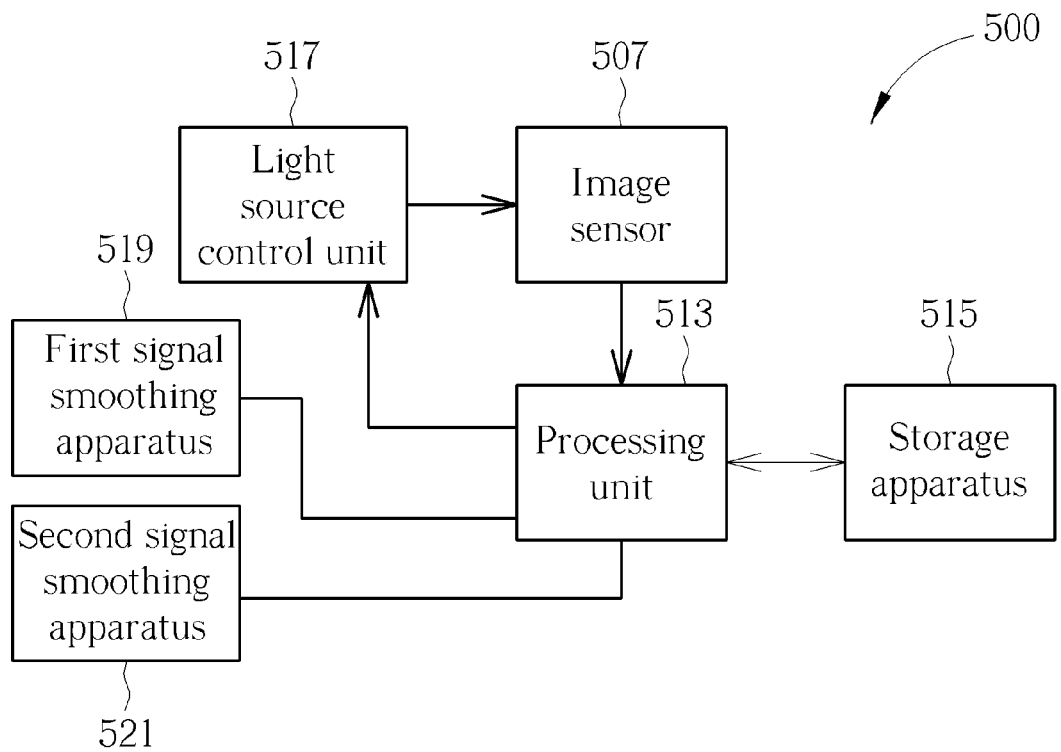

As above-mentioned, the optical mouse in one kind of the optical navigating apparatuses, thus other optical navigating apparatuses can utilize the above-mentioned mechanism. FIG. 5A and FIG. 5B are schematic diagrams illustrating an optical touch control apparatus 500 according to an embodiment of the present invention, which receives a touch control operation performed by an object (ex. finger F). FIG. 5A is a cross sectional view of the optical touch control apparatus 500, and FIG. 5B is a circuit block diagram inside the optical touch control apparatus 500 for controlling the operation thereof. Please refer both FIG. 5A and FIG. 5B to understand the operation for the optical touch control apparatus 500 for more clear. The optical touch control apparatus 500 comprises a sensing surface 503, a light source 505, an image sensor 507, lens 509, 511, a processing unit 513, a storage apparatus 515 and a light source control unit 517. The light source 505 is controlled by the light source control unit 517 to control illuminating operation thereof to emit light to the finger F on the sensing surface 503 to generate an image. The processing unit 513 computes the location and the displacement for the finger F according to captured frames to generate a displacement signal, thereby the finger F can perform the touch control operation. Additionally, the processing unit 513 controls data accessing of the storage apparatus 515 and the operation of the light source control unit 517. The optical touch control apparatus 500 further comprises a first signal smoothing apparatus 519 and a second signal smoothing apparatus 521. The operations for the processing unit 513, the first signal smoothing apparatus 519 and the second signal smoothing apparatus 521 are the same as which of the processing unit 203, the first signal smoothing apparatus 207 and the second signal smoothing apparatus 209 in FIG. 2. That is, the processing unit selects different signal smoothing apparatuses to process signals according to different report rates. Thus it is omitted for brevity here.

Please note, the above-mentioned mechanism can be applied to other types of electronic apparatuses besides above-mentioned optical navigating apparatuses. Therefore, an electronic apparatus according to the present invention can be summarized as follows: An electronic apparatus that can automatically select a signal smoothing apparatus according to a report rate, the electronic apparatus utilizes a first report rate to generate a first report rate output signal according to an output signal, or utilizes a second report rate smaller than the first report rate to generate a second report rate output signal according to the output signal. The electronic apparatus comprises: a first signal smoothing apparatus; a second signal smoothing apparatus, wherein a smoothing ability of the first signal smoothing apparatus is higher than which of the second signal smoothing apparatus; and a processing unit, for controlling the first signal smoothing apparatus to process the first report rate output signal to generate a first smoothed signal if the electronic apparatus generates the first report rate output signal, and for controlling the second signal smoothing apparatus to process the second report rate output signal to generate a second smoothed signal if the electronic apparatus generates the second report rate output signal. Variation of the first smoothed signal is smaller than which of the second smoothed signal.

Additionally, a signal smoothing method can be acquired in view of above-mentioned embodiments, the signal smoothing method can be performed by a program recorded in a computer readable recording media. The signal smoothing method comprises: determining a report rate of the electronic apparatus; and utilizing the first signal smoothing apparatus to process the first report rate output signal to generate a first smoothed signal if the electronic apparatus generates the first report rate output signal, and utilizing the second signal smoothing apparatus to process the second report rate output signal to generate a second smoothed signal if the electronic apparatus generates the second report rate output signal. Variation of the first smoothed signal is smaller than which of the second smoothed signal.

Figure 6:
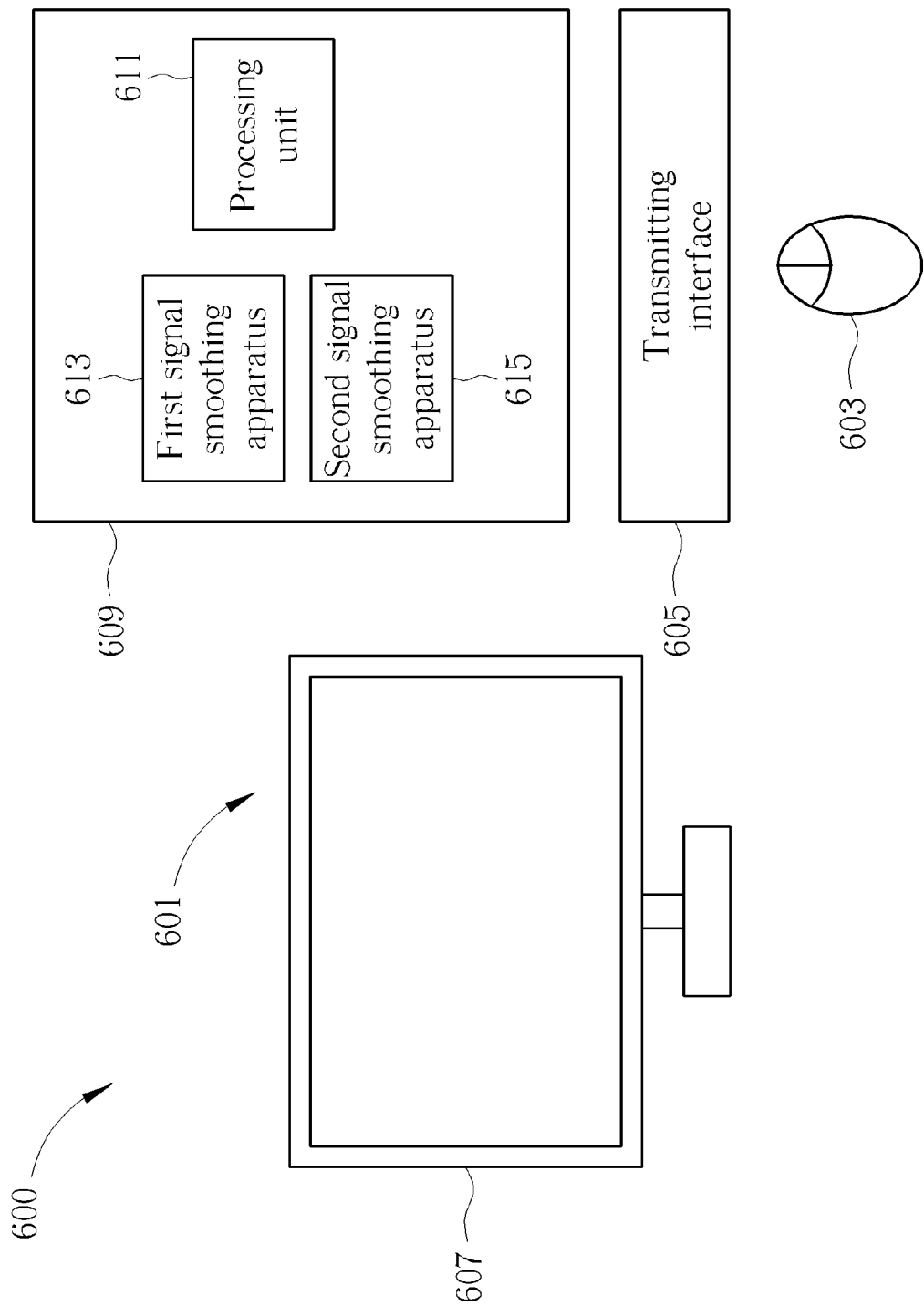
FIG. 6 is a schematic diagram illustrating an electronic system according to an embodiment of the present invention.

The above-mentioned processing unit, the first signal smoothing apparatus, and the second signal smoothing apparatus can be provided to other apparatuses besides the above-mentioned portable electronic apparatus such as an optical navigating apparatus. FIG. 6 is a schematic diagram illustrating an electronic system 600 according to an embodiment of the present invention. As shown in FIG. 6, the electronic system 600 comprises a first electronic apparatus 601, a second electronic apparatus 603 and a transmitting interface 605. In this embodiment, the first electronic apparatus 601 is a computer comprising a display 607 and a host 609. The second electronic apparatus 603 is an optical mouse and the second electronic apparatus 603 transmits at least one output signal to the first electronic apparatus 601 via the transmitting interface 605. It does not mean to limit the present invention, however. The first electronic apparatus 601 can be electronic apparatuses other than the computer, and the second electronic apparatus 603 can be the optical navigating apparatus or other peripheral electronic apparatus other than the optical mouse. Comparing with the embodiment shown in FIG. 2, the processing unit 611, the first signal smoothing apparatus 613 and the second signal smoothing apparatus 615 in FIG. 6 not only can be provided in the second electronic apparatus 603 as FIG. 2, but also can be provided in the first electronic apparatus 601, such as FIG. 6. Additionally, in the embodiment of FIG. 2, the signal smoothing apparatus is selected only according to the report rate for the second electronic apparatus. In the embodiment of FIG. 6, the signal smoothing apparatus can be selected further according to the report rate for the transmitting interface 605, besides the report rate for the second electronic apparatus 603.

A signal smoothing method can be acquired according to the embodiment of FIG. 6, which be performed by a program recorded in a computer readable recording media. The signal smoothing method comprises: determining a report rate of the second electronic apparatus or the transmitting interface; and utilizing the first signal smoothing apparatus to process the first report rate output signal to generate a first smoothed signal if the second electronic apparatus or the transmitting interface outputs the first report rate output signal, and utilizing the second signal smoothing apparatus to process the second report rate output signal to generate a second smoothed signal if the second electronic apparatus or the transmitting interface outputs the second report rate output signal. Variation of the first smoothed signal is smaller than which of the second smoothed signal.

It should be noted that the main idea for the present invention is to provide smoothing method with different smoothing abilities. Thus, the above-mentioned embodiments do not mean to limit the scope of the present invention. Data with high report rate can correspond to more powerful smoothing ability or less powerful smoothing ability, depending on different design requirements.

In view of the above mentioned embodiments, a suitable signal smoothing apparatus can be selected according to the report rate, thus the hard decision issue illustrated in the prior art can be solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic apparatus that can automatically select a signal smoothing apparatus according to a report rate, the electronic apparatus utilizes a first report rate to generate a first report rate output signal according to an output signal, or utilizes a second report rate smaller than the first report rate to generate a second report rate output signal according to the output signal, wherein the electronic apparatus comprises:
 a first signal smoothing apparatus;
 a second signal smoothing apparatus, wherein a smoothing ability of the first signal smoothing apparatus is higher than which of the second signal smoothing apparatus; and
 a processing unit, for controlling the first signal smoothing apparatus to process the first report rate output signal to generate a first smoothed signal if the electronic apparatus generates the first report rate output signal, and for controlling the second signal smoothing apparatus to process the second report rate output signal to generate a second smoothed signal if the electronic apparatus generates the second report rate output signal;
 wherein variation of the first smoothed signal is smaller than which of the second smoothed signal.

2. The electronic apparatus of claim 1, wherein the first report rate is higher than a first predetermined value, and the second report rate is lower than the first predetermined value.

3. The electronic apparatus of claim 2, if the electronic apparatus utilizes a third report rate to output a third report rate output signal according to the output signal and the third report rate is lower than a second predetermined value, the processing unit does not perform any smoothing operation to the third report rate output signal, wherein the second predetermined value is smaller than the first predetermined value.

4. The electronic apparatus of claim 1,
 wherein the electronic apparatus sequentially outputs the first report rate output signal at a first data report point, a second data report point and a third data report point, wherein timing of the first data report point is earlier than which the second data report point and the third data report point, and timing of the second data report point is earlier than which of the third data report point;
 where the first signal smoothing apparatus smoothes the first report rate output signal outputted at the second data report point according to the first report rate output signal outputted at the first data report point if the processing unit utilizes the first signal smoothing apparatus to process the first report rate output signal;
 wherein the electronic apparatus sequentially outputs the second report rate output signal at a fourth data report point, a fifth data report point and a sixth data report point, wherein timing of the fourth data report point is earlier than which the fifth data report point and the sixth data report point, and timing of the fifth data report point is earlier than which the sixth data report point;
 where the second signal smoothing apparatus smoothes the second report rate output signal outputted at the fifth data report point according to the second report rate output signal outputted at the sixth data report point if the processing unit utilizes the second signal smoothing apparatus to process the second report rate output signal.

5. The electronic apparatus of claim 1, wherein the first signal smoothing apparatus is a first filter, the second signal smoothing apparatus is a second filter, where a number the stages for the first filter is more than which of the second filter.

6. The electronic apparatus of claim 5, wherein the first filter is an infinite impulse response filter, and the second filter is a finite impulse response filter.

7. The electronic apparatus of claim 1, wherein the electronic apparatus is an optical navigating apparatus, where the output signal comprises at least one image signal indicating displacement for the optical navigating apparatus.

8. A computer readable recording media storing at least one program, a signal smoothing method can be performed if the program is executed, the electronic apparatus utilizes a first report rate to generate a first report rate output signal according to an output signal, or utilizes a second report rate smaller than the first report rate to generate a second report rate output signal according to the output signal, the electronic apparatus comprises a first signal smoothing apparatus and a second signal smoothing apparatus, wherein a smoothing ability of the first signal smoothing apparatus is higher than which of the second signal smoothing apparatus, where the signal smoothing method comprises:
 (a) determining a report rate of the electronic apparatus; and
 (b) utilizing the first signal smoothing apparatus to process the first report rate output signal to generate a first smoothed signal if the electronic apparatus generates the first report rate output signal, and utilizing the second signal smoothing apparatus to process the second report rate output signal to generate a second smoothed signal if the electronic apparatus generates the second report rate output signal;
 wherein variation of the first smoothed signal is smaller than which of the second smoothed signal.

9. The computer readable recording media of claim 8, wherein the first report rate is higher than a first predetermined value, and the second report rate is lower than the first predetermined value.

10. The computer readable recording media of claim 9, wherein the step (b) further comprises:
 if the electronic apparatus utilizes a third report rate to output a third report rate output signal according to the output signal and the third report rate is lower than a second predetermined value, perform no smoothing operation to the third report rate output signal, wherein the second predetermined value is smaller than the first predetermined value.

11. The computer readable recording media of claim 8, wherein the signal smoothing method further comprises:

controlling the electronic apparatus to sequentially output the first report rate output signal at a first data report point, a second data report point and a third data report point, wherein timing of the first data report point is earlier than which the second data report point and the third data report point, and timing of the second data report point is earlier than which of the third data report point; and controlling the electronic apparatus to sequentially output the second report rate output signal at a fourth data report point, a fifth data report point and a sixth data report point, wherein timing of the fourth data report point is earlier than which the fifth data report point and the sixth data report point, and timing of the fifth data report point is earlier than which the sixth data report point;

wherein the step (b) further comprises:

controlling the first signal smoothing apparatus to smooth the first report rate output signal outputted at the second data report point according to the first report rate output signal outputted at the first data report point if the processing unit utilizes the first signal smoothing apparatus to process the first report rate output signal; and controlling the second signal smoothing apparatus to smooth the second report rate output signal outputted at the fifth data report point according to the second report rate output signal outputted at the sixth data report point if the processing unit utilizes the second signal smoothing apparatus to process the second report rate output signal.

12. The computer readable recording media of claim 8, wherein the first signal smoothing apparatus is a first filter, the second signal smoothing apparatus is a second filter, where a number the stages for the first filter is more than which of the second filter.

13. The computer readable recording media of claim 12, wherein the first filter is an infinite impulse response filter, and the second filter is a finite impulse response filter.

14. The computer readable recording media of claim 8, wherein the electronic apparatus is an optical navigating apparatus, where the output signal comprises at least one image signal indicating displacement for the optical navigating apparatus.

15. An electronic system that can automatically select a signal smoothing apparatus according to a report rate, comprising:

a first electronic apparatus;

a second electronic apparatus;

a transmitting interface, wherein the second electronic apparatus transmits at least one output signal to the first electronic apparatus via the transmitting interface, where the second electronic apparatus or the transmitting interface utilizes a first report rate to output a first report rate output signal according to an output signal, or utilizes a second report rate smaller than the first report rate to output a second report rate output signal according to the output signal;

a first signal smoothing apparatus;

a second signal smoothing apparatus, wherein a smoothing ability of the first signal smoothing apparatus is higher than which of the second signal smoothing apparatus; and a processing unit, for controlling the first signal smoothing apparatus to process the first report rate output signal to generate a first smoothed signal if the second electronic apparatus or transmitting interface outputs the first report rate output signal, and for controlling the second signal smoothing apparatus to process the second report rate output signal to generate a second smoothed signal if the second electronic apparatus or the transmitting interface outputs the second report rate output signal;

wherein variation of the first smoothed signal is smaller than which of the second smoothed signal.

16. The electronic system of claim 15, wherein the first report rate is higher than a first predetermined value, and the second report rate is lower than the first predetermined value.

17. The electronic system of claim 16, if the second electronic apparatus utilizes or the transmitting interface a third report rate to output a third report rate output signal according to the output signal and the third report rate is lower than a second predetermined value, the processing unit does not perform any smoothing operation to the third report rate output signal, wherein the second predetermined value is smaller than the first predetermined value.

18. The electronic system of claim 15, wherein the second electronic apparatus or the transmitting interface sequentially outputs the first report rate output signal at a first data report point, a second data report point and a third data report point, wherein timing of the first data report point is earlier than which the second data report point and the third data report point, and timing of the second data report point is earlier than which of the third data report point;

where the first signal smoothing apparatus smoothes the first report rate output signal outputted at the second data report point according to the first report rate output signal outputted at the first data report point if the processing unit utilizes the first signal smoothing apparatus to process the first report rate output signal;

wherein the second electronic apparatus or the transmitting interface sequentially outputs the second report rate output signal at a fourth data report point, a fifth data report point and a sixth data report point, wherein timing of the fourth data report point is earlier than which the fifth data report point and the sixth data report point, and timing of the fifth data report point is earlier than which the sixth data report point;

where the second signal smoothing apparatus smoothes the second report rate output signal outputted at the fifth data report point according to the second report rate output signal outputted at the sixth data report point if the processing unit utilizes the second signal smoothing apparatus to process the second report rate output signal.

19. The electronic system of claim 15, wherein the first signal smoothing apparatus is a first filter, the second signal smoothing apparatus is a second filter, where a number the stages for the first filter is more than which of the second filter.

20. The electronic system of claim 19, wherein the first filter is an infinite impulse response filter, and the second filter is a finite impulse response filter.

21. The electronic system of claim 15, wherein the first electronic apparatus is a computer, and the second electronic apparatus is a peripheral electronic apparatus.

22. The electronic system of claim 21, wherein the peripheral electronic apparatus is an optical navigating apparatus, where the output signal comprises at least one image signal indicating displacement for the optical navigating apparatus.

23. A computer readable recording media storing at least one program, a signal smoothing method applied to an electronic system can be performed if the program is executed, the electronic system comprises a first electronic apparatus, a second electronic apparatus, a transmitting interface, a first signal smoothing apparatus and a second signal smoothing apparatus, wherein a smoothing ability of the first signal smoothing apparatus is higher than which of the second signal smoothing apparatus, where the second electronic apparatus transmits at least one output signal to the first electronic apparatus via the transmitting interface, wherein the second electronic apparatus or the transmitting interface utilizes a first report rate to output a first report rate output signal according to an output signal, or utilizes a second report rate smaller than the first report rate to output a second report rate output signal according to the output signal, where the signal smoothing method comprises:
- (a) determining a report rate of the second electronic apparatus or the transmitting interface; and
- (b) utilizing the first signal smoothing apparatus to process the first report rate output signal to generate a first smoothed signal if the second electronic apparatus or the transmitting interface outputs the first report rate output signal, and utilizing the second signal smoothing apparatus to process the second report rate output signal to generate a second smoothed signal if the second electronic apparatus or the transmitting interface outputs the second report rate output signal;

wherein variation of the first smoothed signal is smaller than which of the second smoothed signal.

24. The computer readable recording media of claim 23, wherein the first report rate is higher than a first predetermined value, and the second report rate is lower than the first predetermined value.

25. The computer readable recording media of claim 24, wherein the step (b) further comprises:
- if the second electronic apparatus or the transmitting interface utilizes a third report rate to output a third report rate output signal according to the output signal and the third report rate is lower than a second predetermined value, perform no smoothing operation to the third report rate output signal, wherein the second predetermined value is smaller than the first predetermined value.

26. The computer readable recording media of claim 23, wherein the signal smoothing method further comprises:
- controlling the second electronic apparatus or the transmitting interface to sequentially output the first report rate output signal at a first data report point, a second data report point and a third data report point, wherein timing of the first data report point is earlier than which the second data report point and the third data report point, and timing of the second data report point is earlier than which of the third data report point; or
- controlling the second electronic apparatus or the transmitting interface to sequentially output the second report rate output signal at a fourth data report point, a fifth data report point and a sixth data report point, wherein timing of the fourth data report point is earlier than which the fifth data report point and the sixth data report point, and timing of the fifth data report point is earlier than which the sixth data report point;

wherein the step (b) further comprises:
- controlling the first signal smoothing apparatus to smooth the first report rate output signal outputted at the second data report point according to the first report rate output signal outputted at the first data report point if the processing unit utilizes the first signal smoothing apparatus to process the first report rate output signal; and
- controlling the second signal smoothing apparatus to smooth the second report rate output signal outputted at the fifth data report point according to the second report rate output signal outputted at the sixth data report point if the processing unit utilizes the second signal smoothing apparatus to process the second report rate output signal.

27. The computer readable recording media of claim 23, wherein the first signal smoothing apparatus is a first filter, the second signal smoothing apparatus is a second filter, where a number the stages for the first filter is more than which of the second filter.

28. The computer readable recording media of claim 27, wherein the first filter is an infinite impulse response filter, and the second filter is a finite impulse response filter.

29. The computer readable recording media of claim 23, wherein the first electronic apparatus is a computer, and the second electronic apparatus is a peripheral electronic apparatus.

30. The computer readable recording media of claim 29, wherein the peripheral electronic apparatus is an optical navigating apparatus, where the output signal comprises at least one image signal indicating displacement for the optical navigating apparatus.

* * * * *